United States Patent [19]

Mills

[11] Patent Number: 5,193,206
[45] Date of Patent: Mar. 9, 1993

[54] REDUCE INSTRUCTION SET MICROPROCESSOR

[75] Inventor: Jonathan W. Mills, Bloomington, Ind.

[73] Assignee: Motorola, Inc., Schaumburg, Ill.

[21] Appl. No.: 926,366

[22] Filed: Aug. 10, 1992

Related U.S. Application Data

[63] Continuation of Ser. No. 457,628, Dec. 27, 1989, abandoned.

[51] Int. Cl.$^5$ .............................................. G06F 9/22
[52] U.S. Cl. .............................. 395/800; 364/DIG. 2; 364/DIG. 1; 364/925.6; 364/923.5; 364/232.23
[58] Field of Search .................. 364/DIG. 1, DIG. 2; 395/375, 800

[56] References Cited

U.S. PATENT DOCUMENTS

4,847,755  7/1989  Morrison et al. .................. 364/200

OTHER PUBLICATIONS

Jonathan Wayne Mills, "A Pipelined Architecture for Logic Programming with a Complex but Single-Cycle Instruction Set.", IEEE 1984/89/0000/0526, (1989), pp. 526-533.

Jonathan W. Mills, "A Pipelined Architecture for Logic Programming with a Complex but Single-Cycle Instruction Set.", Technical Report No. 284 from Computer Science Department Indiana University, Bloomington, Indiana (Jul. 1989) pp. 1-28.

Primary Examiner—Robert B. Harrell
Attorney, Agent, or Firm—Jeffrey D. Nehr; Frank J. Bogacz; Jordan C. Powell

[57] ABSTRACT

A LOW RISC (reduced instruction set computer) III microprocessor reduces the number of branches taken during execution of logic, functional, and symbolic programs to increase the efficiency and effectiveness of pipelined execution memory interleave, and reduces the complexity of RISC architectures. The LOW RISC III is a 40-bit, 4-stage pipelined processor which is pipelined with each stage operating synchronously in parallel. Pipeline breaks are reduced by moving partial unification and trail checking into hardware, and eliminating many short branches by conditional execution of the various instructions.

13 Claims, 4 Drawing Sheets

REDUCE INSTRUCTION SET MICROPROCESSOR

This application is a continuation of prior application Ser. No. 07/457,628, filed Dec. 27, 1989 now abandoned.

BACKGROUND OF THE INVENTION

This invention relates, in general, to microprocessing units, and more specifically, to a microprocessor for logic programming, functional programming, and symbolic computing.

Conventional microprocessor architectures are divided into two categories, CISC (complex instruction set computer) architectures and RISC (reduced instruction set architectures). All sequential and parallel computers are composed of either single processors or multiple-element groups of processing elements (parallel processors) that are based on CISC, RISC or both types of computer architecture. Giving an example for each class of computer: a sequential computer with a CISC architecture is the Motorola 68040; a sequential computer with a RISC architecture is the Motorola 88000; a parallel computer with a CISC architecture is the NASA Jet Propulsion Laboratory Hypercube with Motorola 68020 processing elements; a parallel computer with a RISC architecture is the Bolt, Beranek and Newman (BBN) Butterfly II with Motorola 88000 processing elements.

None of the above computers are ideally suited to execute logic programs, functional programs and symbolic programs written in languages exemplified by but not limited to Prolog, Scheme, and ML. The reasons why these computers specifically, and all microprocessors in general, are unsuitable are listed with accompanying discussions in the following paragraphs numbered (1), (2), (3), (4) and (5).

(1) These architectures do not have support for tagged data types. Tagged data types are dealt with by assigning an arbitrary bit field with the meaning of the tag (which distinguishes one kind of datum from another). However, the bit field is not treated independently by the architecture, but is part of a single value which is a number. Conventional microprocessors distinguish tagged data types by correspondences within ranges of representable numbers. (2) The operations necessary to execute logic, functional, and symbolic programming differ in type and frequency from those operations supported by conventional architectures. Conventional microprocessors require multiple instructions to extract bit fields from a number, compare bit fields independently to determine membership in a class of tagged data types, and construct tagged data objects.

(3) Logic, functional, and symbolic programs use irregular data structures such as heaps and stacks which are composed of aggregate items containing data of dissimilar size. Zero or single cycle index and bounds checks are required to establish that a single datum is a member of a given aggregate. Conventional microprocessors require multiple instructions to perform these checks.

(4) Logic, functional, and symbolic programs execute short branches frequently based on the type of a data object being processed. Conventional microprocessors control execution of short code fragments as a stream of non-contiguous instruction sequences linked by conditional branch instructions. Due to the resulting high branch frequency pipelined execution and interleaved memory, addressing is not effective in a conventional microprocessor.

(5) Logic, functional and symbolic programs further are not characterized by long, frequent, and shallow series of procedure calls, as are programs written in procedural languages such as Pascal, C and Ada. Instead, logic, functional and symbolic programs have long and deep sequences of linked procedure calls in which there are many generations of call, and in which the most recent generation typically does not return to its parent caller but to its eldest ancestor. Register windows, such as are found in conventional microprocessors, are efficient and effective for parent-child sequences of procedure calls, but not for generational procedure calling.

A LOW RISC microprocessor evolved from a Warren Abstract Prolog Machine (WAM) as the underlying functions of the WAM were identified, and then organized as a simple abstract machine (SAM). The set of primitive operations comprising the SAM instruction set was then reduced yielding the present invention known as the LOW RISC III, for three reasons:

1. Globally optimized code is generated in terms of the primitives, omitting superfluous operations executed by the more general WAM and SAM instructions.

2. Single instructions are provided for critical operations, such as a multi-way dispatch based on the value of a tag. In addition, tag and value processing are performed in parallel. Note that neither of these functions is provided in RISC processors such as the MIPS machine, the Berkeley RISC I and the Berkeley RISC II.

3. The implementation would pipeline execution of the primitives, thus reducing the primitives' apparent execution time.

SUMMARY OF THE INVENTION

Accordingly, it is an object of the present invention to provide a reduced instruction set (RISC) microprocessor which reduces the number of branches taken during execution of logic, functional, and symbolic programs to increase efficiency and effectiveness of pipelined execution and memory interleaving.

Another object of the present invention is to provide a RISC microprocessor which reduces the complexity of the RISC architecture.

The above objects of the present invention are achieved within a LOW RISC III (reduced instruction set computer) III microprocessor. LOW RISC III is a 40-bit 4-stage pipelined processor which is pipelined with each stage operating synchronously in parallel. Pipeline breaks in the LOW RISC III are reduced by moving partial unification and trail checking into hardware, and eliminating many short branches by conditional execution of the various instructions.

The above and other objects, features, and advantages of the present invention will be better understood from the following detailed description taken in conjunction with the accompanying drawings.

DETAILED DESCRIPTION OF THE INVENTION

LOW RISC III (low reduced instruction set) is an architecture derived from an abstract architecture for Prolog, the Warren Abstract Prolog Machine (commonly known as the WAM), which has been shown to be suitable as a target architecture for logic programming, functional programming and symbolic computing (e.g., theorem proving). The LOW RISC III is designed in a "top-down" fashion in three versions, each version integrating one or more functions to support logic programs into a RISC-like architecture.

The LOW RISC III operates in a pipeline fashion. Pipeline operations for microprocessors are discussed in Kogge, P., *The Architecture of Pipelined Computers*, New York: McGraw-Hill, 1981.

Figure 1:
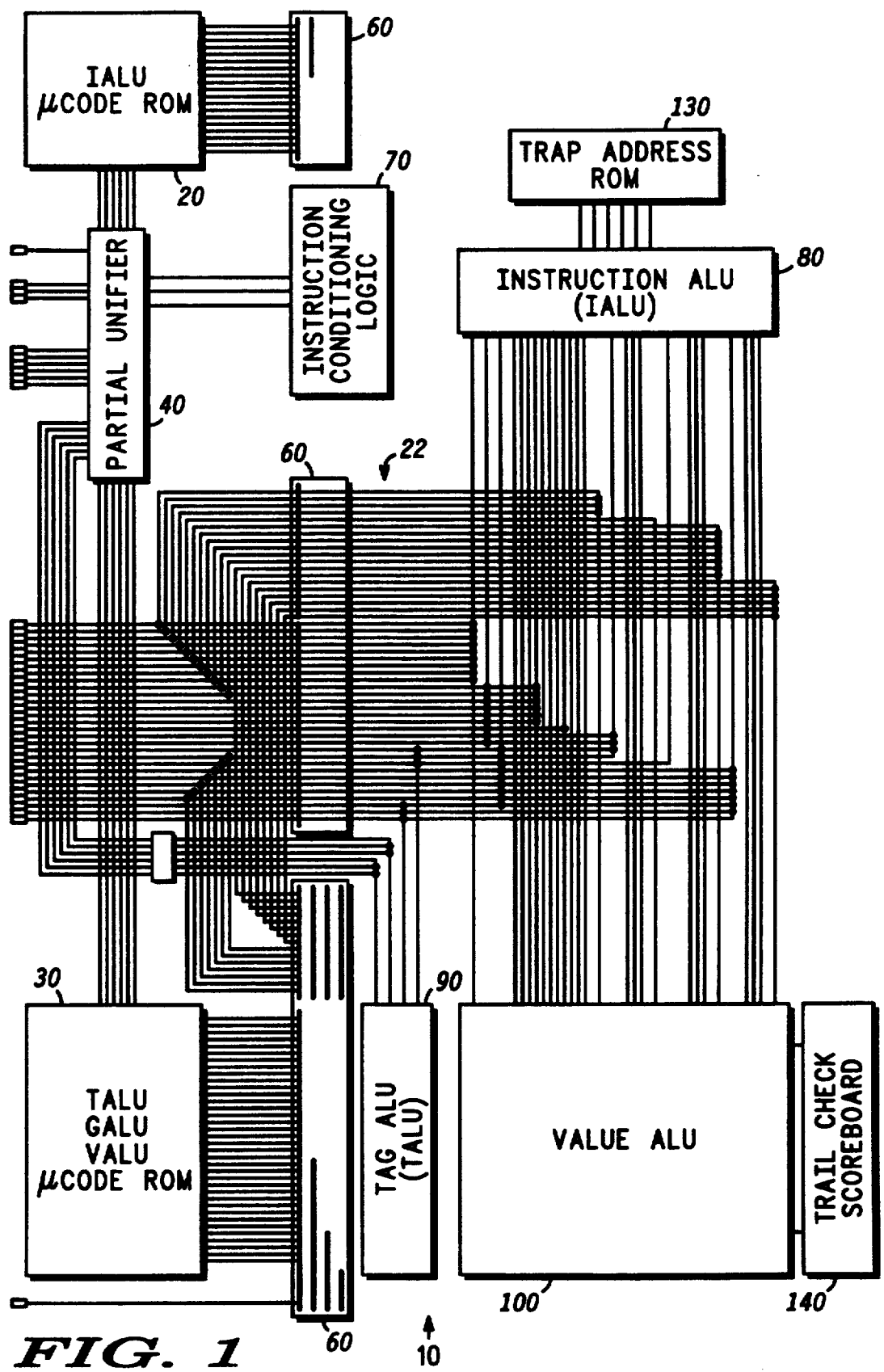
FIG. 1 is a schematic diagram of a LOW RISC III microprocessor according to the present invention.

FIG. 1 shows a LOW RISC III microprocessor 10 according to the present invention. LOW RISC III 10 comprises IALU (instruction arithmetic logic unit) microcode ROM 20, TALU (tag ALU)/GALU(garbage ALU)/VALU(value ALU) microcode ROM 30, partial unifier 40, instruction conditioning logic 70, instruction ALU 80, tag ALU 90, value ALU 100, and trail scoreboard 140.

The microcode for LOW RISC III 10 is a data stationary microcode. In other words the microcode follows the instruction or the data through an ALU, or through the machine's phases. Each control point in the machine is related to a particular phase in the execution of an instruction. The microcode for each particular phase is generated from IALU microcode ROM 20 for all phases at the same time.

IALU microcode ROM 20 and TALU, GALU, VALU microcode ROM 30 supply instructions to partial unifier 40, and to latches 60.

The microcode is stored throughout the phases of the operation of LOW RISC III 10 in latches 60. As the respective latches in latches 60 progress from left to right, representing progression of the operation of LOW RISC III 10, the latches get progressively smaller. The smaller size represents latching of fewer control bits of instructions. In the initial stages of the operation, all of the microcode for an entire instruction is latched in latches 60. As the operation progresses, a first group of control signals is "tapped off" from the latch to the farthest left of latch 60. LOW RISC III 10 is controlled at that phase of the operation by those latches exposed to the right side of latches 60. With each phase of the operation, additional latch is removed, resulting in a "stair stepped" configuration. Therefore, at any time X, a number of control points are controlled by the current instructions, represented by the shorter latch, and previous instructions, represented by the latches to the left which are "exposed."

Partial unifier 40 replaces signals that appear as bits in the instruction operation with bits that are generated from a pair of tags from two data words previously used in another operation. As it generates these signals, which are a microcode address and an instruction condition signal, it supplies the signals to microcode ROMs 20 and 30 for the next address. Alternatively, partial unifier 40 may supply the signals to instruction ALU 80 and tag ALU 90. Partial unifier 40 intercepts the control of the machine right at the time the instruction is being decoded. This allows partial unifier 40 to intercept the control of LOW RISC III 10 during the decode phase to change the operation of the partial unify instruction based on the values of the two tags. Therefore, in one instruction partial unify 40 can process as many operations as the two tags can designate. For instance, if the tags are three bits wide, the partial unification instruction can do as many as 64 different things based on the values of the two tags. With larger tag bits, such as a 4 bit tag, partial unifier 40 where certain input bits could be ignored, the partial unifier could handle as many as two raised to the eighth power, or 256, different operations.

Instruction ALU 80 causes an instruction to be generated or selected. For instance, when partial unifier 40 cannot perform a partial unify on a given set of information bits and branching is required, IALU 80 may branch to, or select, trap address ROM 130. Trap address ROM 130 stores a set of instructions which are used when partial unifier 40 cannot partial unify. These instructions allow LOW RISC III 10 to continue operation. Alternatively, partial unifier 40 may cause instruction ALU microcode ROM 20 to send a signal to IALU 80 causing an internal instruction counter to increment by one. Incrementing brings the next instruction, or op code, into the operation.

Tag ALU 90, value ALU 100, and trail check scoreboard 140 are all arithmetic logic units and operate similar to the Mead-Conway OM ALU. A description of the Mead-Conway OM ALU is found in *Introduction to VLSI Systems*, Mead and Conway, Addison Wesley, 1980, chapter 1.

Trail checking in trail checking scoreboard 140 is performed when an unbound variable reference is loaded, with the actual trailing performed by a subsequent instruction which must be a conditional stack push. When LOW RISC III 10 executes a load or dereference instruction the value loaded is checked. If the check shows that the value is an unbound variable and must be trailed when it is initiated, the register into which it is loaded is marked by setting a trail-check flag in trail check scoreboard 140. Later, when the unbound variable is bound, the status bit is used to conditionally execute a trailing instruction.

The operation of each element within LOW RISC III 10, as well as the interoperation and connection, will be understood from the following section.

LOW RISC III OPERATION

Figure 2:
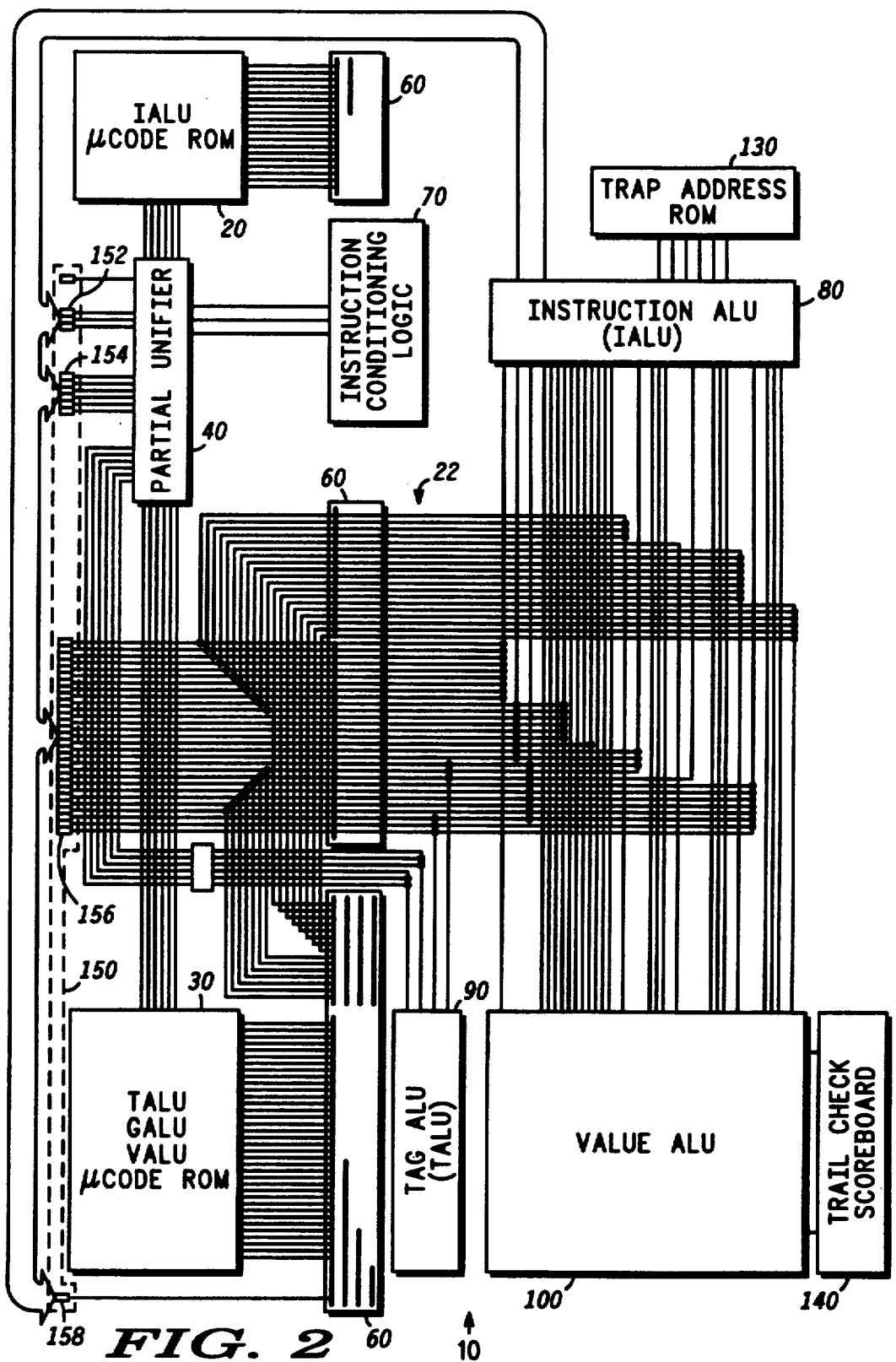
FIG. 2 shows a flow diagram of the operation of the LOW RISC III microprocessor for the instruction fetch components.
Figure 3:
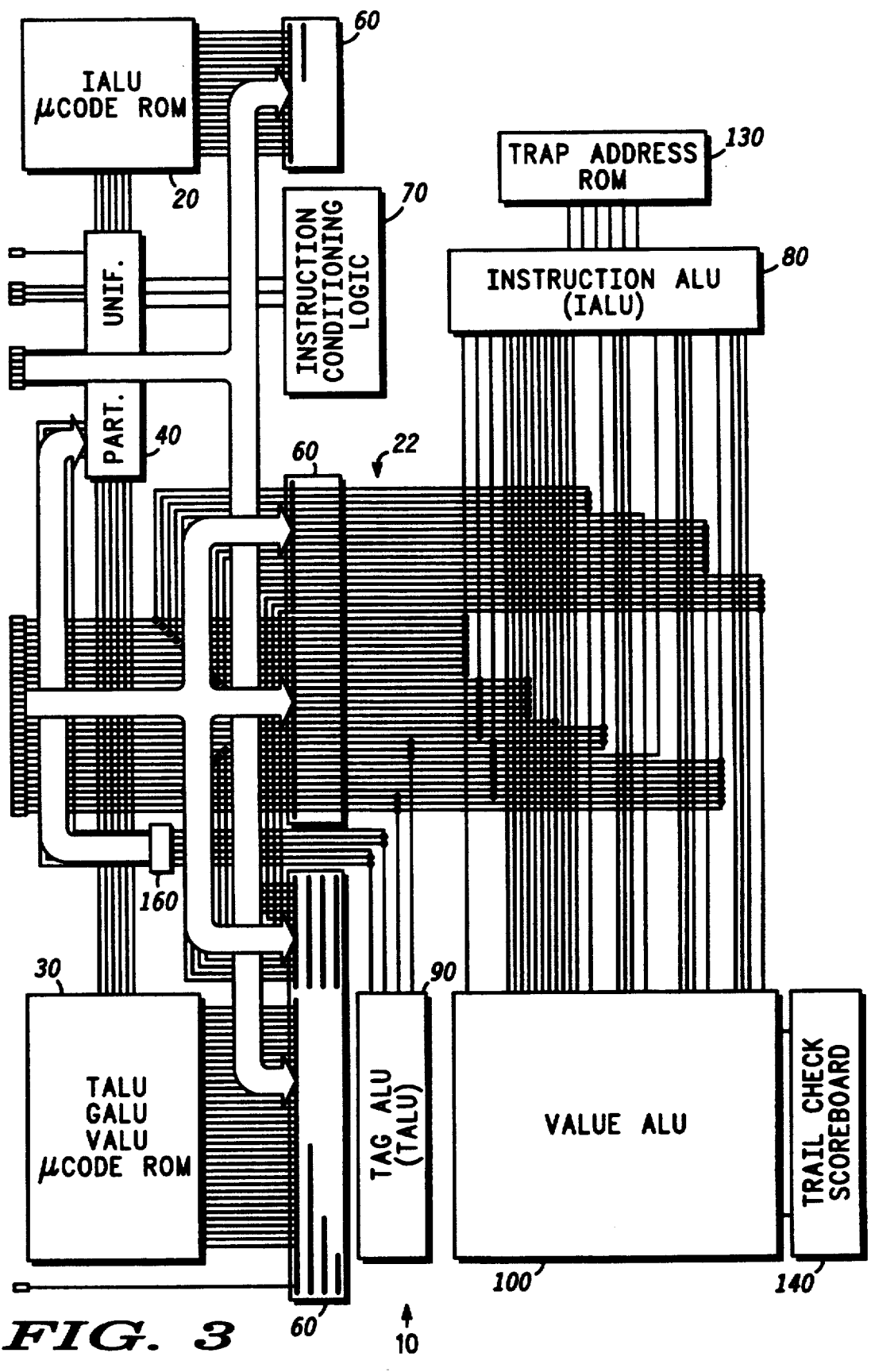
FIG. 3 shows a flow diagram of the operation of the LOW RISC III microprocessor for the instruction decode components.
Figure 4:
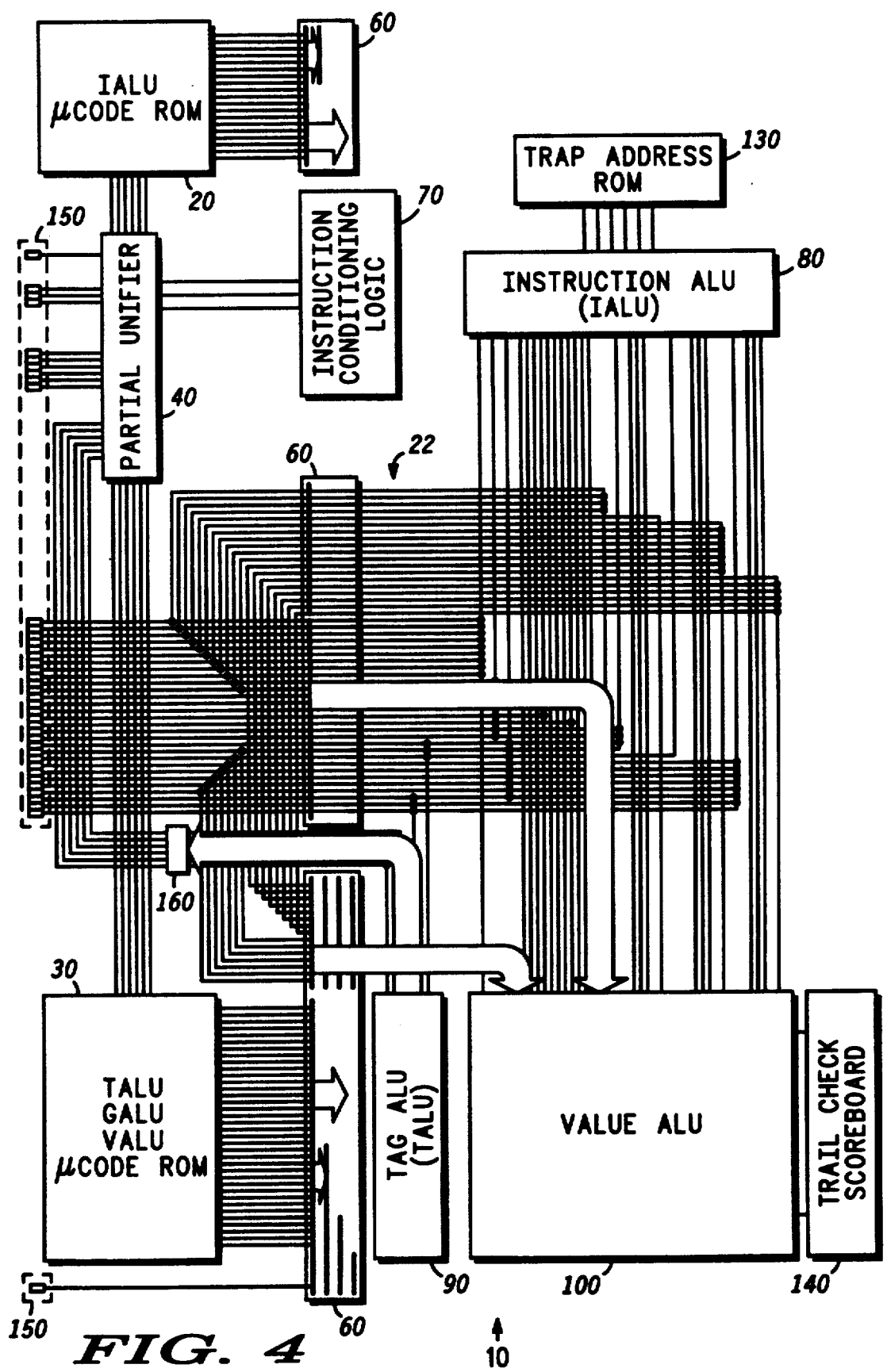
FIG. 4 shows a flow diagram of the operation of the LOW RISC III microprocessor for the operand fetch.

FIGS. 2 through 4 represent the flow of LOW RISC III 10 in the various phases of operation.

Instruction Fetch Phase—FIG. 2 is the instruction fetch phase of the LOW RISC III 10 operation. The instruction fetch phase begins with an address that will fetch the next instruction generated by IALU 80. That instruction address may come from trap address ROM 130, or from a previously latched immediate data register value. The address may also come from a return address register of VALU ALU 100, or it may be the result of simply incrementing or adding one to the previous contents of an instruction counter in IALU 80. A instruction address selection multiplexer selects one of the four values and presents it to instruction address register 150, a regular general purpose latch. The latched value is used to hold the instruction address stable throughout the instruction read cycle. During this phase the instruction address is relayed to a memory location (memory not shown), where an instruction is stored. The instruction is then output onto a memory data bus to be latched to instruction address register 150. Instruction address register 150 comprises four fields: an instruction condition field 152, a pair of fields 154 for type and class for the op-code, a group of fields for the operands 156, and a set condition code bit 158. When these values have been latched, the instruction fetch phase is completed.

Instruction Decode Phase—FIG. 3 represents the next phase, or the instruction decode phase. During the instruction decode phase a microcode word is generated to control the machine through the remaining phases of its execution for a particular instruction. Information obtained from a previous instruction and stored in a concatenation latch 160 (if the machine is restarting from an undefined state, then the value is zero), is transferred to a mapping ROM in partial unifier 40. The mapping ROM generates an alternate microcode address using the value from concatenation latch 160. The instruction latched in instruction address register 150 during the instruction fetch phase is then latched in latches 60 of immediate data bus 22. The alternate microcode address from the mapping ROM is latched in latches 60 in two latches coupled to IALU microcode ROM 20 and TALU microcode ROM 30.

Operand Fetch Phase—The operand fetch phase is diagrammed in FIG. 4. In this phase, addresses from microcode ROMs 20 and 30 are used to control the reading of registers and latching of values to be used in the next phase of the machine. For instance, TALU microcode ROM 30 relays a signal to tag ALU 90 which causes tag ALU 90 to send information to concatenation latch 160. This information is used in the instruction decode components phase described subsequently. The addresses latched along immediate data bus 22 in latches 60 are relayed to memory registers within value ALU 100. The data from the addressed memory registers are then latched for processing.

Execution Phase—In the execution phase, further latching in latches 60 occurs, similar to the previous phases. In addition, the data latched in value ALU 100 is computed and stored in memory latches.

Data Fetch/Data Store—In this phase, the data stored in the memory latches of value ALU 100 is relayed to an external memory. At the same time, data stored in the external memory from a previous cycle is addressed and retrieved back into value ALU 100 to a memory device latch. It should be noted that the data stored in the external memory does not have to be data which is computed in value ALU 100. In fact, uncomputed data directly from the memory registers may be selected for transmission to the external memory. Such selection would be directed by an address received from immediate data bus 22. However, uncomputed data and computed data cannot be transmitted to the external memory simultaneously. In a single phase, only one or the other may occur.

Dereference/Trail Check/Register Write-back—Dereference is a procedure used to check and see if the input tag within the input address is a bound variable. Bound variables are unique in LOW RISC III since they have values referencing other memory locations. Bound variables are never directly used in calculations. In Prolog in particular, the bound values are not used in computing, but rather are used to find another value in memory and bring it into value ALU 100 for computation. During the dereference phase, if a tag has a bound value, the dereference logic will stall the pipeline, or prevent the other pipeline phases from operating. The machine gets "frozen", or, in other words, refuses to latch any further values for a time. During the "freeze" time, value ALU 100 executes an unlimited number of data fetch cycles until an unbound value is found. At that time, the latches are released, or "unfrozen."

It is possible that value ALU 100 could enter an infinite loop searching for unbound variables if such an unbound variable is not stored in the external memory. Therefore, a counter is built into value ALU 100 to quit searching after iterating through four cycles. If, after four cycles, an unbound variable is not located, value ALU 100 relays a signal to trap address ROM 130. The next instruction in trap address ROM 130 is then relayed to instruction register 40 to restart the entire cycle.

Trail Check Cycle—Trail check scoreboard 140 tracks unbound variables which are retrieved in the dereference phase. Any unbound variable (i.e. the tag is equal to 1) after dereferencing is simultaneously compared to the contents of registers 4-7 using 4 comparators that are a part of the register file not a part of value ALU 100. This comparison happens simulateously with storing the unbound variables value into any register in value ALU 100. The outputs of comparators 4 and 5 are logically "and"ed together and the outputs of comparators 6 and 7 are logically "and"ed together. The outputs of each "and" are logically "or"ed together to produce a "1" if the unbound variable should be trailed and a "0" if the unbound variable should not be trailed. A resulting status bit value is then stored in a single one-bit register within trail check scoreboard 140 which corresponds to a register in value ALU 100 where the unbound variable is stored. This removes the need to make from 1 to 4 comparisons of the unbound variable's value against the contents of the registers 4 through 7 of value ALU 100 by using compare instructions whenever an unbound variable is later used. Otherwise, the pipelining of LOW RISC III is broken through the 4 comparison procedures, substantially slowing the speed of executing the program and reducing the efficiency of interleaved memory.

Register Write-back—The register write-back process facilitates the trail check cycle. Specifically, register write-back retrieves the data from the external memory stored in the memory device latch in the data fetch/data store phase, and writes the data into value ALU 100 registers for future reference. As trail check scoreboard 140 tracks the unbound variables, a "checklist" of the operations performed on the unbound variables is kept within value ALU 100 registers. Where the operations must be reversed, as necessary in Prolog, such operations may be retrieved from the value ALU 100 registers due to the write-back procedure.

LOW RISC III INSTRUCTION SET

The instruction set of LOW RISC III 10 is an extension of a previous LOW RISC instruction set designed to support the more frequent Prolog operations (dereferencing, tag manipulation), and also provide primitive support for built-in arithmetic, bit manipulation, and input/output.

The data manipulation instructions are ADD, SUB (subtract), AND, OR, XOR (exclusive-or), SR (shift right inserting zero), ASR (shift right inserting sign), DRF (dereference), LD (load) and ST (store). Typically an instruction will process the tag, garbage collection and value fields from each source operand in parallel to produce the result. Each instruction has two modes that include the capability to perform a x1 or x16 unconditional branch as part of the instruction.

During the development of LOW RISC III 10 and its extension to a commercial architecture (Short 88) the drawbacks to a purely RISC architecture became even more apparent. Although the architecture supported tags and branches, the branch frequency was still high, and the code density low. Furthermore the penalties imposed by short loops for dereferencing and address checking for trailing (costly but necessary), the lack of stack manipulation instructions for a language that used stacks intensively, and the observation that most unification can be performed non-recursively led to a re-examination of LOW RISC III 10 and the concept of a balanced RISC architecture: an architecture that reduces instruction traffic by increasing the complexity of the instruction set, while retaining many of the constraints of a RISC.

A recent justification of more complex instruction sets introduced the idea of a balanced optimization to an instruction set, arguing for register windows only if instruction traffic could be reduced. In this sense LOW RISC III 10 is a balanced architecture because it is a defenestrated version of the LOW RISC I. As supported by earlier experiences with the LOW RISC I and II, a RISC II-style set of register windows is not useful for a Prolog processor because the number of parameters passed is frequently small but can vary substantially. The uses to which register windows can be put vary widely due to the number of dynamic scopes in Prolog (heap, trail, env, choice pt, recursive unification), and due to the calling structure of a Prolog program.

Pipeline breaks in LOW RISC III 10 are reduced by moving partial unification, trail checking, and short branching into hardware. Partial unification uses the tag flags to select one operation to be executed by the partial unification control unit. Although only one operation can be performed, it is enough to handle most strength-reduced unification in the Warren machine. Trail checking is performed in hardware, with the actual trailing performed by a conditional stack push. Conditional instruction execution is also used to decrease the number of short branches. The frequency of pipeline breaks is small enough for instruction memory interleaving to be effective.

Fast tag processing is provided by extending the number of instructions that set tag flags, and adding the one-cycle partial unification instruction whose operation varies according to the tag flags. Pre-and post-increment and decrement memory addressing modes are added, all of which operate in a single cycle. Stack operations are frequent in Prolog implemented using Warren's model, which can have up to four stack structures. The frequency of sequential reads and writes into the Prolog stacks is shown to be large enough for data memory interleaving to be effective. An analysis of this architecture shows that it is 2.3 times as fast as the Berkeley PLM without memory interleaving, and as much as 15 times faster with 8-way instruction and data memory interleaving. This result implies that a single processor could sustain an inference rate of 6.75 megaLIPS, and reach inference rates approaching 10 megaLIPS.

Fast tag processing avoids the series of test and branch instructions needed by other architectures to determine two operands' types prior to unifying them. The partial unify instruction is a new member of the class of polymorphic instructions which use operand tags to identify the operation to be performed. In LOW RISC III 10, operand tags are composed to form the next microinstruction address, which may be a register transfer, a store assignment, a conditional branch, or a subroutine call. Although only one operation can be performed by partial unify, it is enough to handle most strength-reduced unification in the Warren machine model. Trail checking is performed when an unbound variable reference is loaded, with the actual trailing performed by a conditional stack push. Conditional instruction execution decreases the number of short branches by changing short sequences of "branch around" code into sequential (but possibly not executed) instructions. Pre- and post-increment and decrement memory addressing modes are also added, all of which operate in a single cycle. Stack operations are frequent in Prolog implemented using Warren's model, which can have up to five stack structures. Data memory interleaving is possible because sequential reads and writes into the Prolog stacks comprise ~30% of the data memory references. Because pipeline breaks occur after an average of eight instructions, instruction memory interleaving is also possible, although less effective.

CAPABILITIES AND APPLICATIONS OF THE LOW RISC III

1. LOW RISC III 10 performs symbolic computation on tagged data objects, and basic integer arithmetic and Boolean logic on the values of tagged data objects.

2. LOW RISC III 10 executes programs written in Prolog, Lisp, Scheme, and other functional and logic programming languages, including but not limited to expert systems, theorem provers, automated reasoning programs, and any programs employing the RETE algorithm, unification, resolution, inference or pattern matching.

3. LOW RISC III 10 runs at speeds 10 to 8000 times faster than possible with currently available computers including all present Motorola products, all DEC and IBM products, all Symbolics products, and all computers designed and built in the United States of America, Canada, England, Italy, Japan, Korea and Taiwan that emulate or otherwise simulate the abstract machine for Prolog described by David H. D. Warren in Stanford Research Institute Technical Report 309 dated 1983.

Simulation of an earlier version of the LOW RISC (the LOW RISC III) supports this claim by executing Prolog benchmarks at speeds ranging from 300 KLIPS to 700 KLIPS, the same performance range of the Motorola 88000 running at 25 Mhz.

4. LOW RISC III 10 is a balanced computer architecture which equalizes the number of instruction and data fetches automatically to the greatest extent possible. A balanced architecture is one that has the greatest efficiency and the least semantic gap for one or more programming languages: this means that a high level language can be compiled into assembly language on the architecture that requires fewer instruction cycles per language construct than on any other architecture. The LOW RISC III is balanced for Prolog at a minimum. Balancing an architecture will typically use a model that has both RISC and CISC characteristics: instructions are limited to a single cycle, yet allow microcoded control. A more complicated decode mechanism for partial unification is justified because it reduces the number of instruction cycles per data read/write cycles in a Prolog language construct. For this reason register windows are not used, because the Prolog procedure calling mechanism resembles the catch and throw of LISP far more than the structured, nested procedure calls of Pascal. And a complete recursive unification instruction is not designed into the LOW RISC III into hardware because only 5% of the unifications are recursive.

5. Any parallel processor can either include a LOW RISC III as part of a processing element, or substitute a LOW RISC III for the processing element.

The bus architecture is not specified in this document. As long as the bus operates fast enough to handle all requests made by the processor subsystem (which may run at a slower clock speed than the processor), the bus is not critical to the LOW RISC III design.

6. The LOW RISC III can be operated on any defined bus, including but not limited to the VMEbus and the NuBus. 7. LOW RISC III 10 can be implemented in systems that either share or that separate the instruction and data buses in configurations knowledgable to those versed in the art as a Harvard bus architecture (separated instruction and data buses), a Priceton bus architecture (shared instruction and data buses), or with a Yale bus architecture (Harvard from the processor to the caches, Princeton from the caches to memory).

Because all symbolic programming languages require the ability to manipulate programs as data, and data as programs, the use of separate instruction and data memory in the memory susbsystem is not possible. Thus, the use of a Harvard bus architecture to connect the processor subsystem to the memory subsystem is not recommended for general purpose computers built using this design. However, in that class of symbolic programs where data and programs are distinct, and no conversion between them is allowed (as might be the case in an embedded military system), a Harvard bus architecture connecting the processor subsystem to the memory subsystem could be used.

8. The LOW RISC III can be configured with either separate or shared instruction and data buses.

9. The LOW RISC III can be configured either as an IO-mapped or memory-mapped processor, or as a processor without I/O that requires a separate I/O processor.

10. The LOW RISC III can use up to a sixteen-way interleaved memory.

11. The LOW RISC III can run at a clock rate five times faster than the memory cycle time without wait states when using interleaved memory.

Because the LOW RISC III has a reduced branch frequency, faster execution speed can be obtained by the use of an instruction prefetch buffer and interleaved memory. In this configuration, with a branch-taken frequency of 9%, an eight way interleaved memory feeding an eight instruction prefetch buffer can increase execution speed by a factor of five, without requiring a corresponding increase in the memory cycle time.

12. The LOW RISC III can operate with standard memory, but its clock rate will be determined by the cycle time of the memory used.

If slower execution time is acceptable, a cheaper and less complex system can be built that uses non-interleaved memory.

13. Tags can be used to extend conventional languages such as C++ and Smalltalk that use tags to identify data types.

14. 40-bit architecture makes numerical computation easier because full 32-bit values can be represented without using part of the value for the tag.

15. Three-bit tags supported with hardware can be used to represent classes of objects identified with software supported tags.

LOW RISC III PROCESSOR SUBSYSTEM CONFIGURATIONS

Examples of the four basic system configurations are shown below.
1. 88000 special function unit
2. 88000 co-processor
3. VMEbus attached processor
4. Parallel processor node Thus there has been provided, in accordance with the present invention, a LOW RISC III microprocessor that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A reduced instruction set microprocessor for processing operations designated by a plurality of tags, the microprocessor comprising:

means for processing instructions of an instruction set;

means for partially unifying the plurality of tags within the instruction set, generating a microcode address and an instruction condition signal when the plurality of tags are equal to a first set of values, the means for partially unifying coupled to the means for processing instructions;

means for latching the instructions of the instruction set, the means for latching coupled to both the means for processing instructions and the means for partially unifying;

means for generating alternate instructions of an alternate instruction set coupled to the means for partially unifying, the means for generating producing the alternate instructions when the plurality of tags are equal to a second set of values;

a tag arithmetic logic unit (ALU) for sending instruction decode information to the means for latching, the tag ALU coupled to the means for latching and to the means for partially unifying;

a value ALU for data fetching and data storing including storing of a status bit value, the value ALU coupled to the means for generating alternate instructions and to the means for latching; and a trail checking ALU for tracking unbound variables, the trail checking ALU coupled to the value ALU.

2. A microprocessor as claimed in claim 1, wherein the means for processing instructions comprises an instruction ALU microcode read only memory (ROM) for supplying instruction ALU microcode ROM instructions to the means for partially unifying and to the means for latching, the instruction ALU microcode ROM coupled to the means for partially unifying and to the means for latching.

3. A microprocessor as claimed in claim 2, wherein the means for processing instructions further comprises a tag ALU microcode ROM for supplying tag ALU microcode ROM instructions to the means for partially unifying and to the means for latching, the tag ALU microcode ROM coupled to the means for partially unifying and to the means for latching.

4. A microprocessor as claimed in claim 3, wherein the means for processing instructions further comprises a garbage ALU microcode ROM for supplying garbage ALU microcode ROM instructions to the means for partially unifying and to the means for latching, the garbage ALU microcode ROM coupled to the means for partially unifying and to the means for latching.

5. A microprocessor as claimed in claim 4, wherein the means for processing instructions further comprises a value ALU microcode ROM for supplying value ALU microcode ROM instructions to the means for partially unifying and to the means for latching, the value ALU microcode ROM coupled to the means for partially unifying, to the means for latching, to the instruction ALU microcode ROM, to the tag ALU microcode ROM, and to the garbage ALU microcode ROM.

6. A microprocessor as claimed in claim 5, wherein the means for latching comprises a first plurality of latches for latching the instruction ALU microcode ROM instructions, the first plurality of latches coupled to the instruction ALU microcode ROM.

7. A microprocessor as claimed in claim 6, wherein the means for latching further comprises a second plurality of latches for latching the tag ALU microcode ROM instructions, the second plurality of latches coupled to the tag ALU microcode ROM and to the first plurality of latches.

8. A microprocessor as claimed in claim 7, wherein the means for latching further comprises a third plurality of latches for latching the garbage ALU microcode ROM instructions, the third plurality of latches coupled to the garbage ALU microcode ROM.

9. A microprocessor as claimed in claim 8, wherein the means for latching further comprises a fourth plurality of latches for latching the value ALU microcode ROM instructions, the fourth plurality of latches coupled to the value ALU microcode ROM.

10. A microprocessor as claimed in claim 9, wherein the means for latching further comprises a plurality of concatenation latches for receiving the instruction decode information from the tag ALU, the plurality of concatenation latches coupled to the tag ALU and to the means for partially unifying.

11. A microprocessor as claimed in claim 1, wherein the means for latching comprises a means for tapping a group of control signals to control the microprocessor with a combination of a current instruction set and a previous instruction set.

12. A microprocessor as claimed in claim 1, wherein the means for partially unifying comprises means for intercepting control of the microprocessor to enable the microprocessor to perform simultaneous operations depending on the plurality of tags, the means for intercepting coupled to the means for processing instructions.

13. A microprocessor as claimed in claim 1, wherein the means for generating alternate instructions comprises a trap address read only memory.

* * * * *

UNITED STATES PATENT AND TRADEMARK OFFICE
CERTIFICATE OF CORRECTION

PATENT NO. : 5,193,206
DATED : March 9, 1993
INVENTOR(S) : Jonathon W. Mills

It is certified that error appears in the above-identified patent and that said Letters Patent is hereby corrected as shown below:

On the Title page, and in Col. 1, line 1, the Title should be changed to

--REDUCED INSTRUCTION SET MICROPROCESSOR--

Signed and Sealed this

Fourth Day of January, 1994

Attest:

BRUCE LEHMAN

*Attesting Officer*   Commissioner of Patents and Trademarks